(12) United States Patent
Bendert

(10) Patent No.: US 8,236,440 B2
(45) Date of Patent: Aug. 7, 2012

(54) PARTIAL FLOW CELL

(75) Inventor: Richard M. Bendert, Kalispell, MT (US)

(73) Assignee: Zinc Air Incorporated, Columbia Falls, MT (US)

( * ) Notice: Subject to any disclaimer, the term of this patent is extended or adjusted under 35 U.S.C. 154(b) by 0 days.

(21) Appl. No.: 13/102,566

(22) Filed: May 6, 2011

(65) Prior Publication Data

US 2012/0135334 A1 May 31, 2012

(51) Int. Cl.
*H01M 2/38* (2006.01)
*H01M 6/02* (2006.01)

(52) U.S. Cl. ............... 429/72; 429/51; 429/70; 429/50; 429/246

(58) Field of Classification Search .................. None
See application file for complete search history.

(56) References Cited

U.S. PATENT DOCUMENTS

| | | | | |
|---|---|---|---|---|
| 3,804,733 | A * | 4/1974 | Bennion et al. | 204/539 |
| 4,180,623 | A | 12/1979 | Adams | |
| 4,576,878 | A * | 3/1986 | Gahn | 429/51 |
| 4,828,666 | A * | 5/1989 | Iizuka et al. | 204/255 |
| 7,811,438 | B2 | 10/2010 | Lean et al. | |
| 8,013,470 | B2 | 9/2011 | Votoupal et al. | |
| 2005/0158632 | A1 * | 7/2005 | Wang Chen et al. | 429/309 |
| 2006/0063065 | A1 * | 3/2006 | Clarke et al. | 429/105 |
| 2006/0121555 | A1 | 6/2006 | Lean et al. | |
| 2010/0047671 | A1 | 2/2010 | Chiang et al. | |
| 2011/0244277 | A1 | 10/2011 | Gordon, II et al. | |
| 2012/0052347 | A1 | 3/2012 | Wilson et al. | |

OTHER PUBLICATIONS

Zinc-bromine flow battery, Wikipedia, http://en.wikipedia.org/Zinc-bromine_flow_battery, printed May 5, 2011, 3 pgs.
George B. Adams, et al., Rechargeable Alkaline Zinc/Ferricyanide Battery, Final Report Apr. 1, 1980-Jun. 1, 1981, 160 pgs., U.S. Department of Energy, Division of Energy Storage Systems, Lockheed Palo Alto Research Laboratory, Palo Alto, CA, 1981.
George B. Adams, et al., Rechargeable Alkaline Zinc/Ferricyanide Battery, Final Report Sep. 29, 1979-Sep. 28, 1979, U.S. Department of Energy, Division of Energy Storage Systems, Lockheed Palo Alto Research Laboratory, Palo Alto, CA, 1979.

* cited by examiner

*Primary Examiner* — Barbara Gilliam
*Assistant Examiner* — Angela Martin
(74) *Attorney, Agent, or Firm* — Brooks Kushman P.C.

(57) ABSTRACT

A partial flow cell may include a cathode chamber, an anode chamber, and a separator arrangement sandwiched between the cathode and anode chambers. The separator arrangement may be configured to permit ionic flow between electroactive materials disposed within the cathode and anode chambers. One of the cathode and anode chambers may be configured to permit an electroactive material to flow through the chamber during operation. The other of the cathode and anode chambers may be configured to hold an electroactive material fixed within the chamber during operation.

4 Claims, 2 Drawing Sheets

PARTIAL FLOW CELL

TECHNICAL FIELD

This disclosure relates to electrochemical cells.

BACKGROUND

A typical electrochemical cell may include a cathode side and anode side separated by a separator arrangement. The cathode side may include a cathode current collector, a cathode electroactive material (reduced on discharge) and an electrolyte. The anode side may include an anode current collector, an anode electroactive material (oxidized on discharge) and an electrolyte. The separator arrangement separating the cathode and anode sides, inter alia, permits ionic flow therebetween. The current collectors, electroactive materials, electrolytes and separator arrangement thus form an electrochemical reactor that converts chemical energy to electricity. Hence, the current collectors may be (externally) electrically connected together to form an electrical circuit.

In this context, the electrochemical reactor is an electrochemical cell within which the cathode electroactive material and anode electroactive material do not flow into and/or out of the electrochemical reactor during operation: they are fixed.

SUMMARY

A partial flow cell may include a cathode current collector, a catholyte in contact with the cathode current collector, a separator arrangement in contact with the catholyte, and a fixed anode active material in contact with the separator arrangement. The catholyte may include a cathode active material. The separator arrangement may permit ionic flow between the cathode active material and fixed anode active material. The partial flow cell may further include an anode current collector in contact with the fixed anode active material and configured to be externally electrically connected with a cathode current collector.

A partial flow cell may include an anode current collector, an anolyte in contact with the anode current collector, a separator arrangement in contact with the anolyte, and a fixed cathode active material in contact with the separator arrangement. The anolyte may include an anode active material. The separator arrangement may permit ionic flow between the anode active material and fixed cathode active material. The partial flow cell may further include a cathode current collector in contact with the fixed cathode active material and configured to be externally electrically connected with an anode current collector.

A partial flow cell may include a cathode chamber, an anode chamber, and a separator arrangement sandwiched between the cathode and anode chambers. The separator arrangement may be configured to permit ionic flow between electroactive materials disposed within the cathode and anode chambers. One of the cathode and anode chambers may be configured to permit an electroactive material to flow through the chamber during operation. The other of the cathode and anode chambers may be configured to hold an electroactive material fixed within the chamber during operation.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A flow cell is a type of rechargeable cell in which electrolyte containing one or more dissolved electroactive species flows through (into and out of) an electrochemical reactor that converts chemical energy to electricity. Additional electrolyte containing one or more dissolved electroactive species is stored externally, generally in tanks, and is usually pumped through the electrochemical reactor (or electrochemical reactors). A flow cell may thus have variable capacity depending on the size of the external storage tanks.

Figure 1:
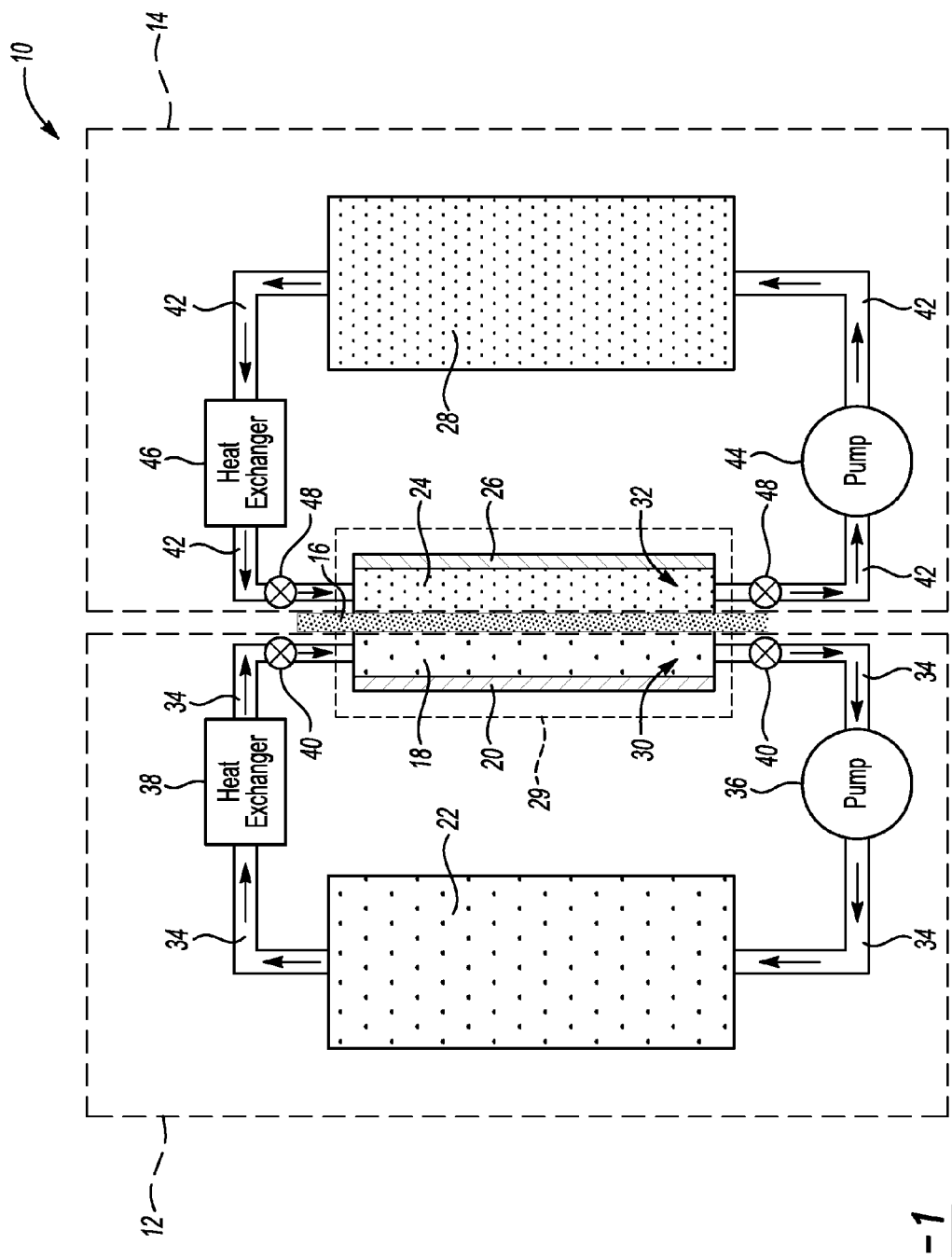
FIG. 1 is a schematic diagram of a flow cell system.

Referring to FIG. 1, a flow cell 10 may include a cathode side 12 and an anode side 14 separated by a separator 16 (e.g., an ion exchange membrane). The cathode side 12 includes a cathode chamber 18, cathode current collector 20 and catholyte reservoir 22. Likewise, the anode side 14 includes an anode chamber 24, anode current collector 26 and anolyte reservoir 28. The separator 16 permits ionic flow between electroactive materials in the cathode and anode chambers 18, 24. The chambers 18, 24, current collectors 20, 26 and separator 16 thus form an electrochemical reactor 29 that converts chemical energy to electricity (and, in certain arrangements, electricity to chemical energy). As such, the cathode 20 and anode 26 may be (externally) electrically connected (together or with other anodes and cathodes respectively) to form an electrical circuit.

Catholyte 30 and anolyte 32 typically combine an electrolyte used to transport ions with cathode and anode reactive materials, respectively, through soluble intermediates. The catholyte 30 and anolyte 32 are circulated on respective sides of the cell 10 to drive the reaction within the electrochemical reactor 29. Hence, the catholyte 30 and anolyte 32 are mobile. To that end, the cathode side 12 further includes inlet/outlet pipes 34 in fluid communication with the cathode chamber 18 and catholyte reservoir 22, and circulation pump 36, heat exchanger 38 and valves 40 each operatively arranged with the inlet/outlet pipes 34. The circulation pump 36, as the name suggests, circulates the catholyte 30 through the cathode chamber 18, catholyte reservoir 22 and inlet/outlet pipes 34. The heat exchanger 38 may be operated to control the temperature of the catholyte 30. The valves 40 may be operated to control the flow of catholyte 30 into and/or out of the cathode chamber 18.

The anode side 14 includes inlet/outlet pipes 42, circulation pump 44, heat exchanger 46 and valves 48. The inlet/outlet pipes 42 are in fluid communication with the anode chamber 24 and anolyte reservoir 28, and circulation pump 44, heat exchanger 46 and valves 48 each operatively arranged with the inlet/outlet pipes 34. The circulation pump 44 circulates the anolyte 32 through the anode chamber 24, anolyte reservoir 28 and inlet/outlet pipes 42. The heat exchanger 46 may be operated to control the temperature of the anolyte 32. The valves 48 may be operated to control the flow of anolyte 32 into and/or out of the anode chamber 24.

The anode side 14 may include a slurry of ZnO and NaOH mixed in the anolyte reservoir 28 to ensure maximum dissolution of active material (zincate) in the solution. This solution may be used as the anolyte 32 for the flow cell 10. On charge, the soluble zincate is reacted at the surface of the anode 26 to deposit Zn metal on the anode surface adjacent to the anode chamber 24. On discharge, a load reverses the reaction oxidizing the Zn metal off the surface of the anode 26. The zincate species is only marginally soluble in the anolyte 32 so the majority of the discharged material precipitates as ZnO. This discharge product is normally stored in the reservoir 28 but should be managed to ensure it does not deposit elsewhere in the system and possibly plug flow channels or mask surface area changing the current distribution.

A controller (not shown) may operate the circulation pumps 36, 44 and valves 40, 48 to flow the catholyte 30 and anolyte 32 into and out of the chambers 18, 24 and reservoirs 22, 28 respectively. Such flow often requires sophisticated flow and temperature controls. With multiple cells (as in a battery), a typical flow system may become more complicated because the same reservoir may be used for the multiple cells. The use of a single reservoir with multiple cells may result in an ionic path between cells. Because the cells are typically connected electrically from cell to cell, this ionic connection may introduce a self discharge or loss of usable energy over time. Engineering fixes for this issue can be complicated and may require complex methods of isolation including multiple reservoirs, long connection lengths to cells, mechanical isolation by valves, draining the system between uses, etc.

Figure 2:
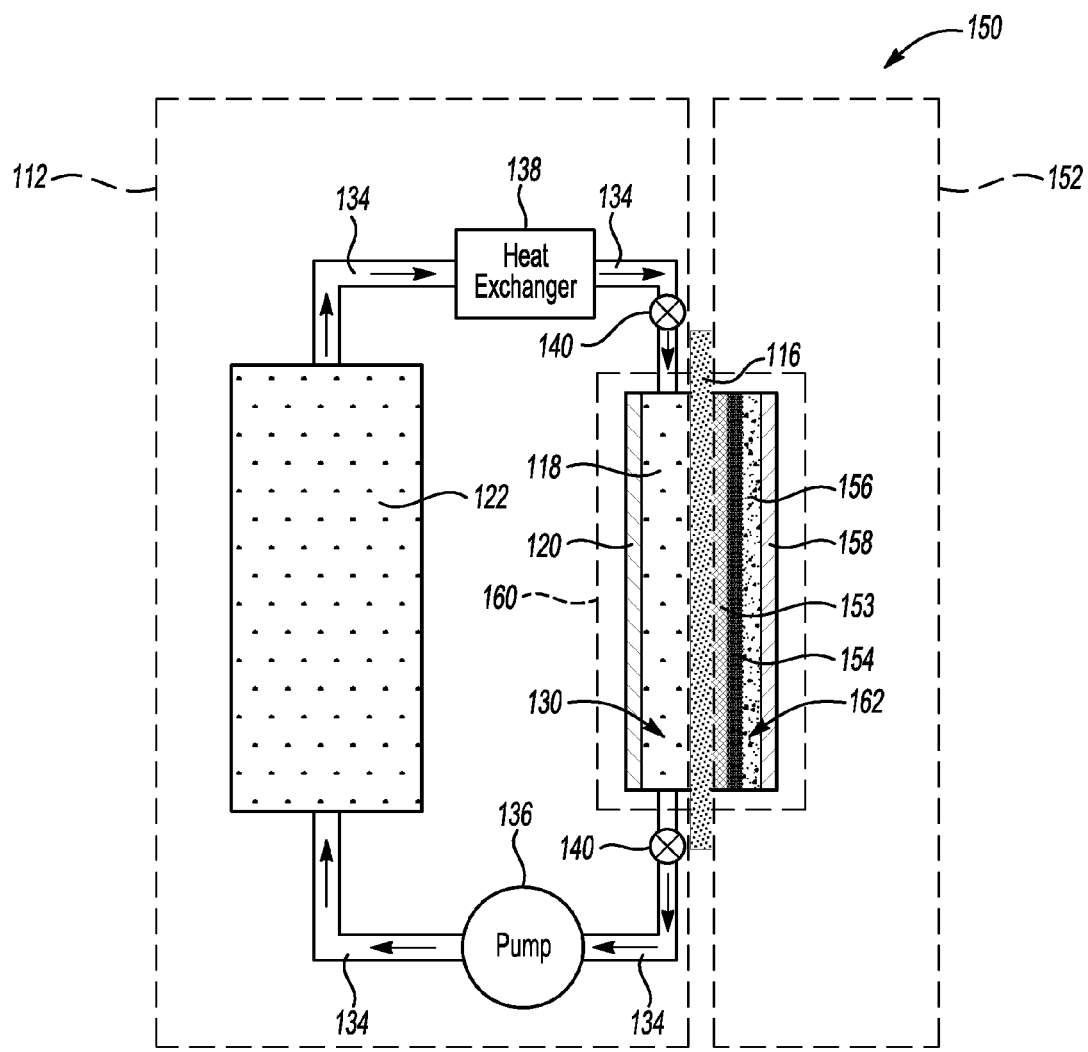
FIG. 2 is a schematic diagram of a partial flow cell system.

Referring to FIG. 2 in which like numbered elements may share similar descriptions, a partial flow cell 150 may include a cathode side 112 and an anode side 152 separated by separators 116, 153, 154, which are in contact with each other. The cathode side 112 may include a cathode chamber 118, cathode current collector 120 and catholyte reservoir 122. The cathode chamber 118, in this example, is partially defined by the separator 116 and cathode current collector 120. The anode side 152 may include an anode chamber 156 and anode current collector 158. The anode chamber 156, in this example, is partially defined by the separator 154 and anode current collector 158. The separators 116, 153, 154, inter alia, permit ionic flow between electroactive materials in the cathode chamber 118 and anode chamber 156. The chambers 118, 156, cathode 120, anode 158, and separators 116, 153, 154 thus form an electrochemical reactor 160 that converts chemical energy to electricity (and, in certain arrangements, electricity to chemical energy). As such, the current collectors 120, 158 may be (externally) electrically connected (together or with other anodes and cathodes respectively) to form an electrical circuit.

As explained above, catholyte 130 typically combines an electrolyte used to transport ions with cathode reactive materials through soluble intermediates. The catholyte 130 is circulated on the cathode side 112 of the cell 150 to drive the reaction within the electrochemical reactor 160. Hence, the catholyte 130 is mobile. The cathode side 112 thus includes inlet/outlet pipes 134 in fluid communication with the cathode chamber 118 and catholyte reservoir 122, and circulation pump 136, heat exchanger 138 and valves 140 each operatively arranged with the inlet/outlet pipes 134. The circulation pump 136 circulates the catholyte 130 through the cathode chamber 118, catholyte reservoir 122 and inlet/outlet pipes 134. The heat exchanger 138 may be operated to control the temperature of the catholyte 130. The valves 140 may be operated to control the flow of catholyte 130 into and/or out of the cathode chamber 118.

Anode electroactive material 162 disposed within the anode chamber 156, in the example of FIG. 2, includes a Zn/ZnO matrix of active material with binders, modifiers and conductive additives pasted onto the anode current collector 158 and in contact with the separator 154. This Zn electrode will then provide the following half cell charge and discharge reactions:

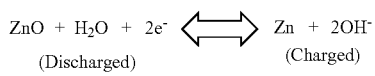

$$ZnO + H_2O + 2e^- \rightleftharpoons Zn + 2OH^-$$
(Discharged) (Charged)

Other matrices of active materials, binders, modifiers and conductive additives may also be used. For example, a Cd/Cd(OH)$_2$ matrix of active material (and associated binders, modifiers and conductive additives) or any other suitable metal/metal oxide or metal/metal hydride matrix of active material may be used.

The separator 116 may be an ion exchange membrane, the separator 153 may be a nonwoven or woven matt, and the separator 154 may be a microporous sheet. The nonwoven matt 153 retains the anode side electrolyte. The microporous sheet 154 prevents migration of the anode electroactive material 162 from the anode chamber 156 to the nonwoven matt 153. A greater or fewer number of separators, however, may be used depending on the electrochemistry of the electroactive materials within the reactor 160. For example, a cadmium based anode may require only a nonwoven or woven matt to retain electrolyte since the cadmium reaction is a solid state reaction. Other arrangements are also possible.

As apparent to those of ordinary skill, the anode electroactive material 162 does not flow into and/or out of the anode chamber 156: it is fixed (it is not mobile). In other words, the anode electroactive material 162 is stationary and held within the anode chamber 156. Because the anode electroactive material 162 is not circulated on the anode side 114 of the cell 150, the anode side 114 need not include a reservoir and associated inlet/outlet pipes, circulation pump, heat exchanger and valves; simplifying the construction and control of the cell 150. (The capacity of the cell 150, however, may be limited by the size of the anode chamber 156.)

A partial flow cell, in other embodiments, may include an anode side configured similarly to that described with respect to FIG. 1 and a cathode side configured equivalently to the anode side 152. That is, such a cathode side may include a cathode adjacent to a cathode chamber having a fixed cathode electroactive material (e.g., Ni(OH)$_2$/NiOOH, Ag/Ag$_2$O, etc.) disposed therein. A separator arrangement including an ion exchange membrane and a nonwoven or woven matt to retain electrolyte may separate the anode and cathode sides, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A partial flow cell comprising:
a cathode chamber;
an anode chamber; and
a separator arrangement sandwiched between the cathode and anode chambers and configured to permit ionic flow between electroactive materials disposed within the cathode and anode chambers, one of the cathode and anode chambers being configured to permit an electroactive material to flow through the chamber during operation, the other of the cathode and anode chambers being configured to store internally an electroactive material within the chamber during operation such that ions flow between the electroactive materials disposed within the cathode and anode chambers.

2. The cell of claim 1 wherein the separator arrangement includes a nonwoven or woven matt configured to retain electrolyte.

3. The cell of claim 2 wherein the separator arrangement further includes a microporous sheet in contact with the nonwoven or woven matt and configured to prevent migration of active material into the nonwoven or woven matt.

4. The cell of claim 1 wherein the separator arrangement includes an ion exchange membrane.

\* \* \* \* \*